United States Patent
Kobayashi

(10) Patent No.: US 11,904,940 B2
(45) Date of Patent: Feb. 20, 2024

(54) STEERING APPARATUS AND SOUND OUTPUT SYSTEM

(71) Applicant: SOCIONEXT INC., Kanagawa (JP)

(72) Inventor: Katsumi Kobayashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 776 days.

(21) Appl. No.: 17/016,225

(22) Filed: Sep. 9, 2020

(65) Prior Publication Data

US 2020/0406968 A1 Dec. 31, 2020

Related U.S. Application Data

(63) Continuation of application No. PCT/JP2018/009751, filed on Mar. 13, 2018.

(51) Int. Cl.
*B62D 15/02* (2006.01)
*G10H 3/24* (2006.01)
*H04S 1/00* (2006.01)
*H04R 1/02* (2006.01)

(52) U.S. Cl.
CPC ............ *B62D 15/029* (2013.01); *G10H 3/24* (2013.01)

(58) Field of Classification Search
CPC .......... B62D 15/029; B62D 1/04; G10H 3/24; G10H 2210/305; H04S 1/002; H04S 2400/11; H04R 1/028; H04R 1/2819; H04R 1/2834; H04R 1/2842; H04R 1/2857; H04R 2499/13; B60R 11/02
USPC ......................................................... 701/41
See application file for complete search history.

(56) References Cited

U.S. PATENT DOCUMENTS

| 4,850,015 | A | 7/1989 | Martin |
| 9,107,021 | B2 | 8/2015 | Florencio et al. |
| 10,587,940 | B2* | 3/2020 | Miyasaka ............... H04R 1/025 |
| 2001/0049302 | A1* | 12/2001 | Hagiwara ............... A63F 13/28 |
| | | | 463/37 |
| 2003/0142835 | A1 | 7/2003 | Enya et al. |
| 2009/0316939 | A1 | 12/2009 | Matsumoto et al. |
| 2011/0101654 | A1 | 5/2011 | Cech |
| 2011/0268281 | A1 | 11/2011 | Florencio et al. |
| 2012/0191267 | A1* | 7/2012 | Ogawa ................ G07C 5/0841 |
| | | | 701/1 |

(Continued)

FOREIGN PATENT DOCUMENTS

| EP | 2495990 A1 | 9/2012 |
| JP | S63-183786 U | 11/1988 |

(Continued)

OTHER PUBLICATIONS

Office Action dated Oct. 5, 2021 issued in corresponding Japanese Patent Application No. 2020-505986, with English translation.

(Continued)

*Primary Examiner* — Tyler D Paige
(74) *Attorney, Agent, or Firm* — Rimon P.C.

(57) ABSTRACT

A steering apparatus according to an aspect of the present disclosure includes a rim member, a center member connected to a steering shaft at a rotation center of the rim member, a first sound output apparatus provided on a front surface of the rim member or the center member, and a first rim chamber unit provided in the rim member and in communication with a space behind the first sound output apparatus.

9 Claims, 14 Drawing Sheets

(56) References Cited

U.S. PATENT DOCUMENTS

| | | | |
|---|---|---|---|
| 2016/0295342 A1 | 10/2016 | Miyasaka et al. | |
| 2017/0106775 A1 | 4/2017 | Takada et al. | |
| 2017/0166235 A1* | 6/2017 | Walker | H04W 4/80 |
| 2019/0273977 A1* | 9/2019 | Miyasaka | H04S 1/00 |

FOREIGN PATENT DOCUMENTS

| | | |
|---|---|---|
| JP | S63-281600 | 11/1988 |
| JP | H07-117682 A | 5/1995 |
| JP | 2001-327754 A | 11/2001 |
| JP | 2003-164577 A | 6/2003 |
| JP | 2003-280766 A | 10/2003 |
| JP | 2003-299199 A | 10/2003 |
| JP | 2005-051605 A | 2/2005 |
| JP | 2005-125843 A | 5/2005 |
| JP | 2010-228612 A | 10/2010 |
| JP | 2010-245890 A | 10/2010 |
| JP | 2012-201162 A | 10/2012 |
| JP | 2014-207546 A | 10/2014 |
| JP | 2016-011005 A | 1/2016 |
| JP | 2017-039451 A | 2/2017 |
| WO | 2011/052080 A1 | 5/2011 |
| WO | 2015/087490 A1 | 6/2015 |

OTHER PUBLICATIONS

International Search Report and Written Opinion issued in corresponding International Application. No. PCT/JP2018/009751, dated Jun. 5, 2018, with partial translation.

International Search Report and Written Opinion dated Oct. 10, 2017 in International Application No. PCT/JP2017/032145, with partial English translation.

Office Action dated Jul. 10, 2019 issued with respect to the related U.S. Appl. No. 16/419,793.

Office Action dated Jan. 16, 2020 issued with respect to the related Korean Patent Application No. 10-2019-7014681 with full machine English translation.

* cited by examiner

STEERING APPARATUS AND SOUND OUTPUT SYSTEM

CROSS-REFERENCE TO RELATED APPLICATION

This application is a continuation application of International application PCT/JP2018/009751 filed on Mar. 13, 2018 and designated the U.S., the entire content of which is incorporated herein by reference.

FIELD

The embodiments discussed herein are related to a steering apparatus and a sound output system.

BACKGROUND

Conventionally, various installation methods have been proposed as installation methods of speakers (sound output apparatuses) of sound output systems in vehicles.

SUMMARY

According to an aspect of an embodiment, a steering apparatus according to an aspect of the present disclosure includes a rim member, a center member connected to a steering shaft at a rotation center of the rim member, a first sound output apparatus provided on a front surface of the rim member or the center member, and a first rim chamber unit provided in the rim member and in communication with a space behind the first sound output apparatus.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENT

Figure 1:
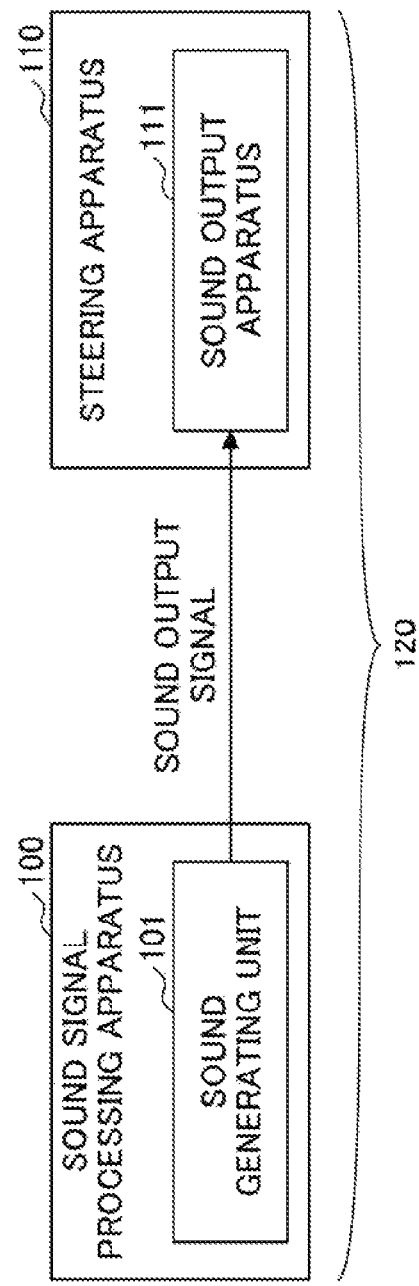
FIG. 1 is a drawing illustrating an example of a system configuration of a sound output system according to a first embodiment.

For example, Japanese Unexamined Utility Model Application Publication No. S63-183786 suggests a method for installing speakers in a steering apparatus manipulated by a driver. According to this method of installation, sounds can be reliably conveyed to the driver. However, when the speakers are disposed in the steering apparatus, the space that can be secured behind the speakers is limited. This affects the frequency characteristics of the output sound, which may make it difficult to, for example, output a low frequency sound.

According to an aspect, the frequency characteristics of the sound emitted from such a sound output apparatus disposed in a steering apparatus are desired to be improved.

Hereinafter, embodiments are described with reference to the accompanying drawings. In this specification and the drawings, constituent elements that have substantially the same functional configurations are denoted with the same reference numerals, and duplicate description is omitted.

First Embodiment

<System Configuration of Sound Output System>

First, a system configuration of a sound output system on a vehicle according to the first embodiment is explained. FIG. 1 is a drawing illustrating an example of a system configuration of the sound output system according to the first embodiment.

As illustrated in FIG. 1, a sound output system 120 includes a sound signal processing apparatus 100 and a steering apparatus 110 provided with a sound output apparatus 111. The sound signal processing apparatus 100 and the sound output apparatus 111 are connected to be able to transmit and receive signals.

In the sound signal processing apparatus 100, a sound generating program and the like are installed. The sound signal processing apparatus 100 functions as a sound generating unit 101 by executing the sound generating program. The sound generating unit 101 generates a sound output signal, and transmits the generated sound output signal to the sound output apparatus 111. The sound output apparatus 111 outputs the sound output signal transmitted by the sound generating unit 101.

<Example of Installation of Sound Output System>

Next, an example of installation of each apparatus of the sound output system 120 in the vehicle is explained. In the sound output system 120 installed in the vehicle, for example, the functions of the sound signal processing apparatus 100 are implemented in a navigation apparatus.

Figure 2:
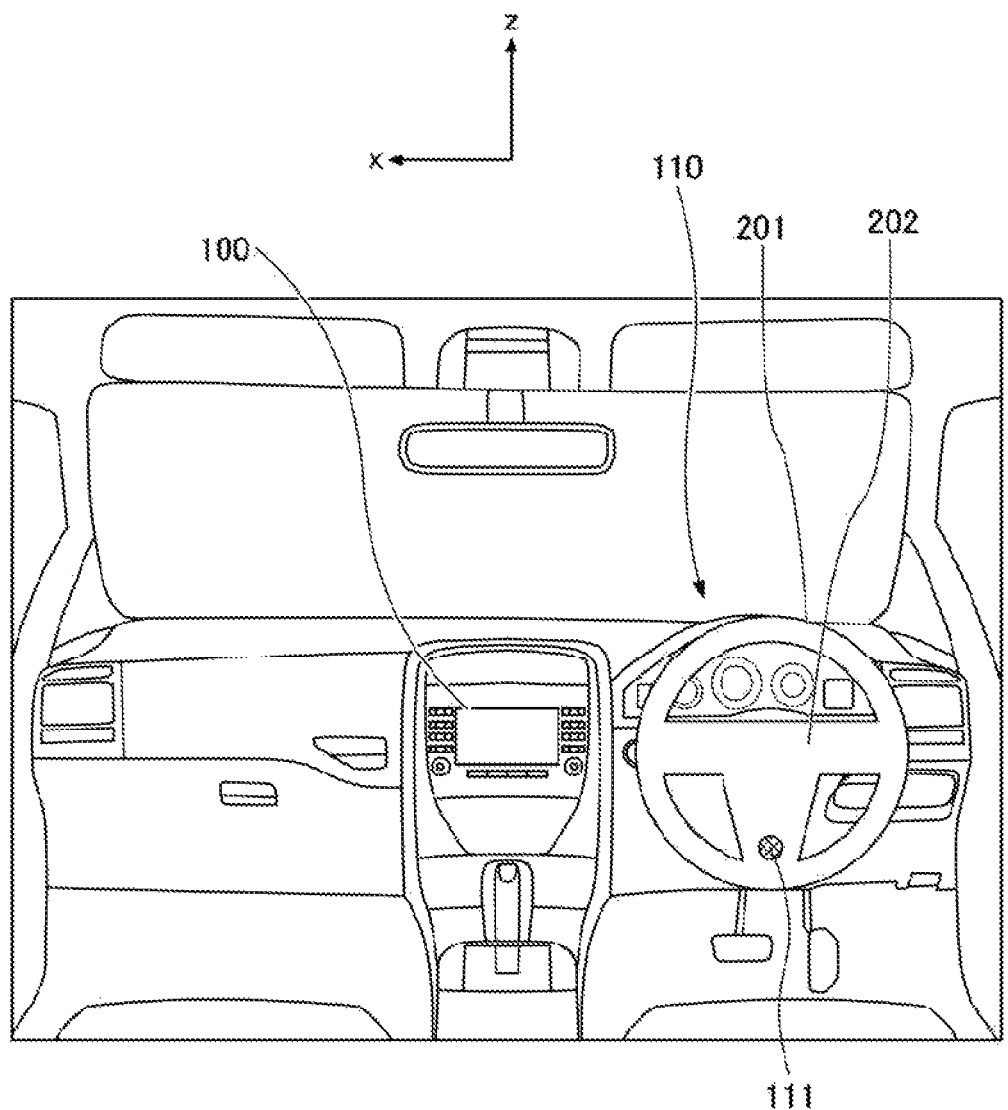
FIG. 2 is a drawing illustrating an example of installation of each apparatus of the sound output system in a vehicle according to the first embodiment.

FIG. 2 is a drawing illustrating an example of installation of each apparatus of the sound output system 120 in the vehicle according to the first embodiment. As illustrated in FIG. 2, for example, a navigation apparatus in which the functions of the sound signal processing apparatus 100 are implemented is arranged in a center console of the vehicle. Also, for example, the speakers serving as the sound output apparatus 111 are disposed at a position indicated in FIG. 2 of the steering apparatus 110 manipulated by the driver of the vehicle.

The steering apparatus 110 includes: a rim member 201 in a ring shape configured to be grabbed by the driver; and a center member 202 connected to a steering shaft (not illustrated) at a center of rotation of the rim member 201. In the example of FIG. 2, the speakers serving as the sound output apparatus 111 are disposed at a lower position of the center member 202 (specifically, at a lower position when the steering apparatus 110 is at an angle of 0 degrees).

As illustrated in FIG. 2, in the present embodiment, a direction from the right-hand side to the left-hand side in the lateral direction of the vehicle is defined as an x axis direction, and a direction from the lower side to the upper side in the height direction of the vehicle is defined as a z axis direction. Further, although not illustrated in FIG. 2, in the present embodiment, a direction from the front to the rear in the longitudinal direction of the vehicle is defined as a y axis direction.

<Hardware Configuration of Sound Signal Processing Apparatus>

Figure 3:
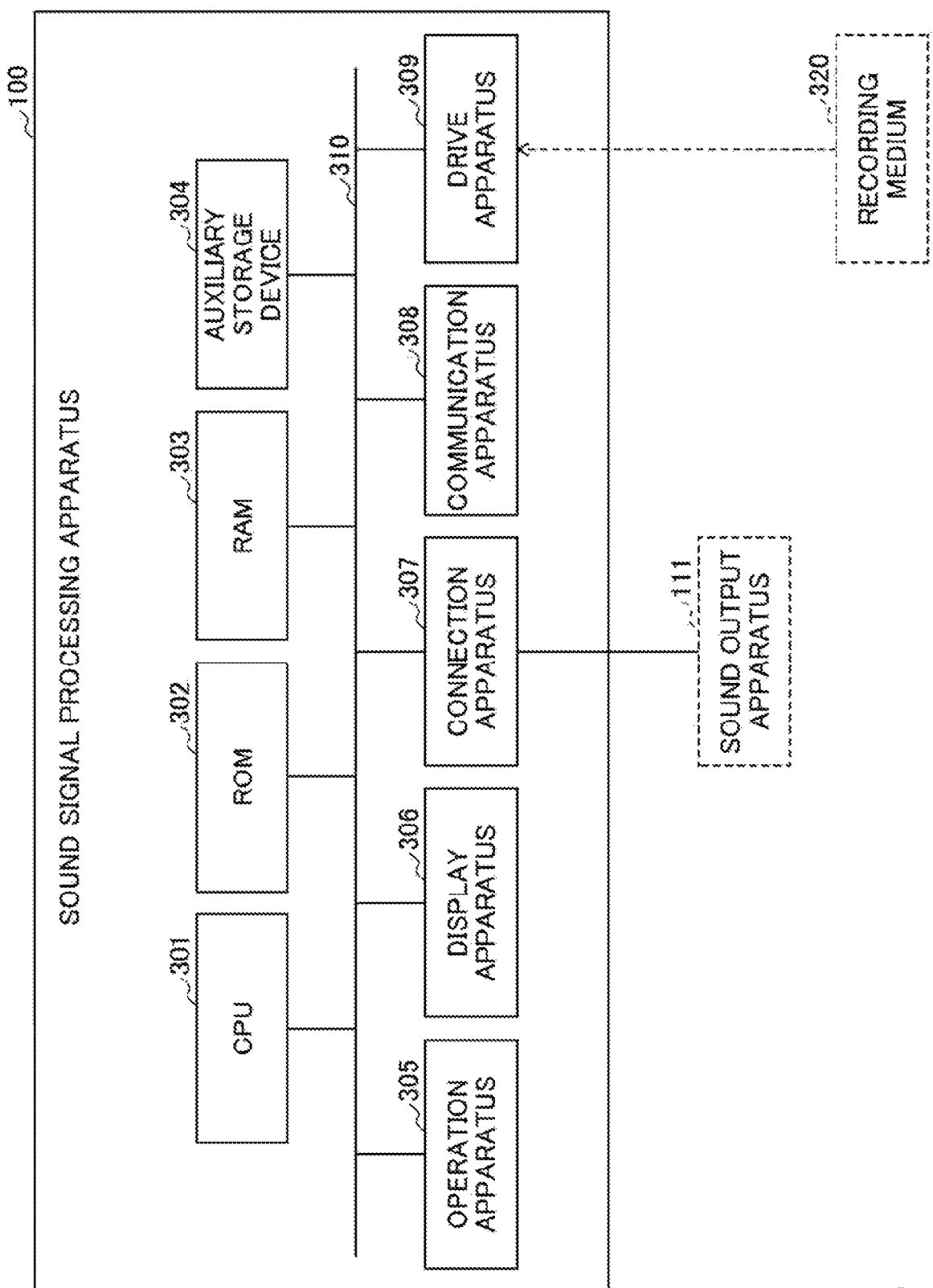
FIG. 3 is a drawing illustrating an example of a hardware configuration of a sound signal processing apparatus.

Next, the hardware configuration of the sound signal processing apparatus 100 is explained. FIG. 3 is a drawing illustrating an example of a hardware configuration of a sound signal processing apparatus.

As illustrated in FIG. 3, the sound signal processing apparatus 100 includes a CPU (Central Processing Unit) 301, ROM (Read Only Memory) 302, and RAM (Random Access Memory) 303. The CPU 301, the ROM 302, and the RAM 303 constitute what is termed as a computer.

In addition, the sound signal processing apparatus 100 includes an auxiliary storage device 304, an operation apparatus 305, a display apparatus 306, a connection apparatus 307, a communication apparatus 308, and a drive apparatus 309. Each of the pieces of hardware of the sound signal processing apparatus 100 are connected with each other via the bus 310.

The CPU 301 is an arithmetic processing unit executing various kinds of programs (for example, a sound generating program, and the like) installed in the auxiliary storage device 304.

The ROM 302 is a non-volatile memory. The ROM 302 functions as a main storage device that stores various programs and the like which the CPU 301 uses to execute various programs installed in the auxiliary storage device 304. Specifically, the ROM 302 stores boot programs such as BIOS (Basic Input and Output System) and EFI (Extensible Firmware Interface).

The RAM 303 is a volatile memory such as DRAM (Dynamic Random Access Memory) or SRAM (Static Random Access Memory). The RAM 303 functions as a main storage device that provides a work area in which various programs installed in the auxiliary storage device 304 are expanded when the programs are executed by the CPU 301.

The auxiliary storage device 304 is an auxiliary storage device that stores various programs and parameters used for execution of the various programs.

The operation apparatus 305 receives input of various instructions from the driver. The operation apparatus 305 may have various button switches, a predetermined or given operation device, or a touch panel integrally formed with the display apparatus 306.

The connection apparatus 307 makes a connection with the sound output apparatus 111, and sends, to the sound output apparatus 111, a sound output signal generated by the CPU 301 executing various programs. The connection with the sound output apparatus 111 may be made with wires or may be made by short-range wireless communication such as Bluetooth (registered trademark). The communication apparatus 308 is a communication device for communicating with the network.

The drive apparatus 309 is a device for setting the recording medium 320. Examples of the recording medium 320 include a CD-ROM, a flexible disk, a magneto-optical disk, and the like that record information either optically, electrically, or magnetically. Further, examples of the recording medium 320 include semiconductor memory such as ROM or flash memory that electrically records information.

For example, various programs are installed to the auxiliary storage device 304 by setting the distributed recording medium 320 on the drive apparatus 309 and causing the drive apparatus 309 to read various programs recorded in the recording medium 320.

<Configuration of Steering Apparatus>

Next, the configuration of the steering apparatus 110 is described. In this case, in particular, the configuration related to the installation of the sound output apparatus 111 is described. In the steering apparatus 110 according to the first embodiment, not only the inside of the center member 202 is hollowed out but also the inside of the rim member 201 is hollowed out in order to secure a space sufficient for emitting a low frequency sound when the sound output apparatus 111 is installed. Accordingly, on the negative side in the y axis direction with respect to the sound output apparatus 111, not only the space in the center member 202 but also the closed space along the circular direction of the rim member 201 can be secured, when the sound output apparatus 111 is installed on the steering apparatus 110. In other words, with the steering apparatus 110 according to the first embodiment, a configuration approximately equivalent to a configuration of a closed stereo apparatus can be achieved. Accordingly, the steering apparatus 110 according to the first embodiment can improve the frequency characteristics of the sound, and can output a low frequency sound. Hereinafter, the configuration examples (three configuration examples) of the steering apparatus according to the first embodiment is described.

(1) First Configuration Example of Steering Apparatus

Figure 4A:
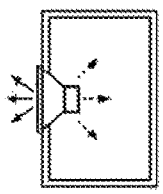
FIGS. 4A to 4C are drawings illustrating a first configuration example of the steering apparatus according to the first embodiment.
Figure 4B:
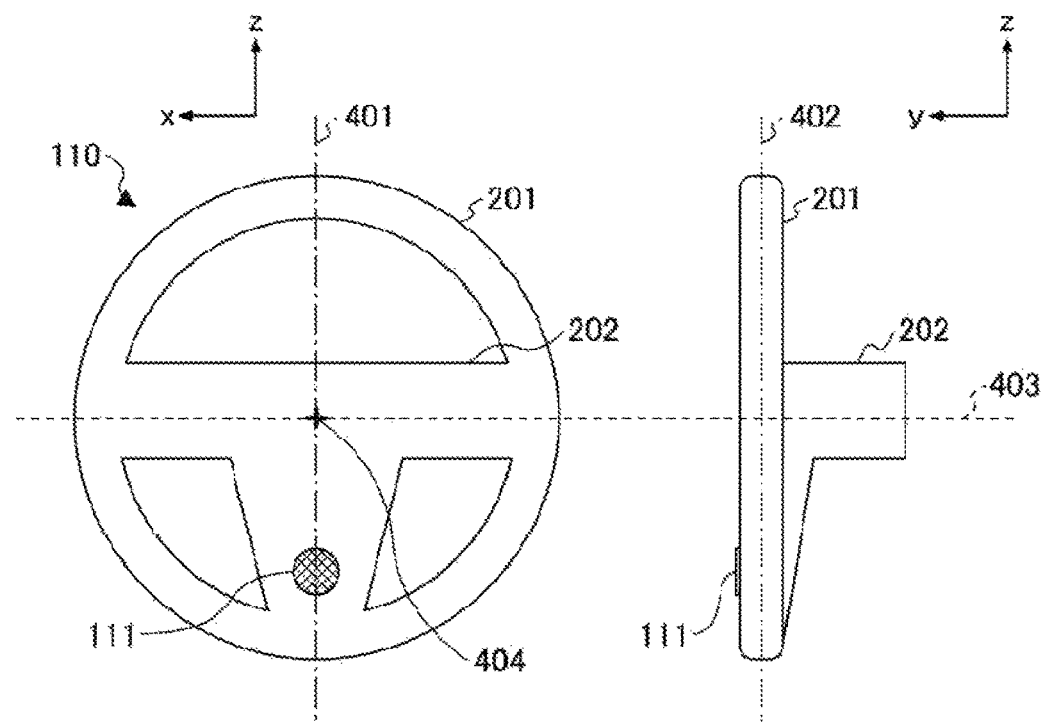
Figure 4C:
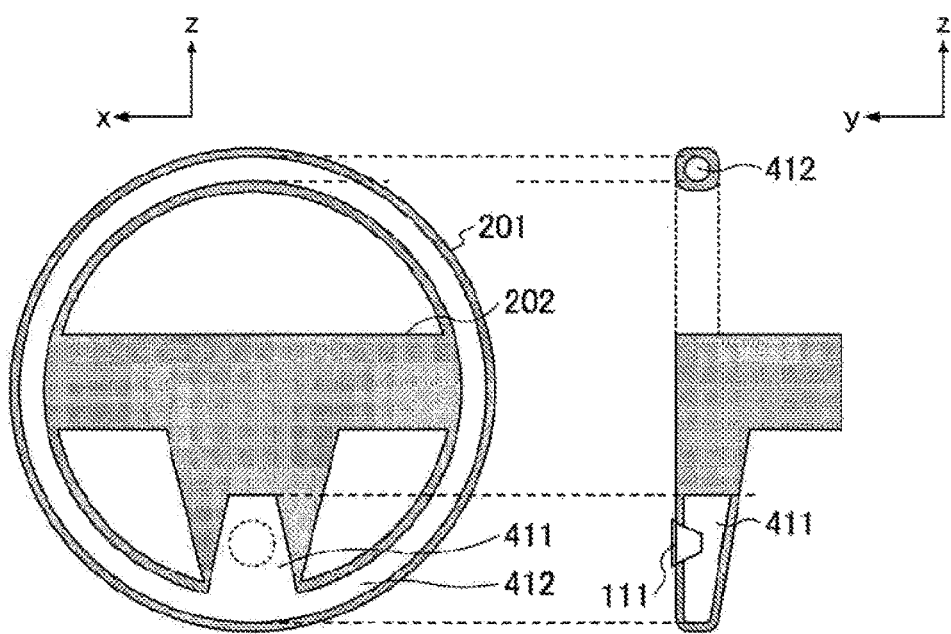

FIGS. 4A to 4C are drawings illustrating a first configuration example of a steering apparatus according to a first embodiment. Among them, FIG. 4A is a schematic diagram illustrating a closed stereo apparatus. FIG. 4B includes a front view and a right side view illustrating an external configuration of the steering apparatus 110 achieving a configuration approximately equivalent to a closed stereo apparatus.

As illustrated in FIG. 4B, the sound output apparatus 111 is installed oriented toward the driver (i.e., toward the positive side in the y axis direction) at a lower position on the front surface of the center member 202 including a rotation center 404 of the rim member 201.

FIG. 4C illustrates a front sectional view of the steering apparatus 110 taken along an alternate long and short dash line 402 of FIG. 4B, and a side sectional view of the steering apparatus 110 taken along an alternate long and short dash line 401 of FIG. 4B.

As illustrated in FIG. 4C, in the center member 202, a space (first center chamber unit) 411 is provided on the negative side in the y axis direction with respect to the position where the sound output apparatus 111 is provided. Also, in the rim member 201, a space (first rim chamber unit) 412 is provided throughout the entire circumference of the ring shape of the rim member 201.

Furthermore, the first center chamber unit 411 and the first rim chamber unit 412 are in communication with each other. Accordingly, on the negative side in the y axis direction with respect to the position where the sound output apparatus 111 is provided, the closed space sufficient for emitting a low frequency sound can be secured.

(2) Second Configuration Example of Steering Apparatus

Figure 5A:
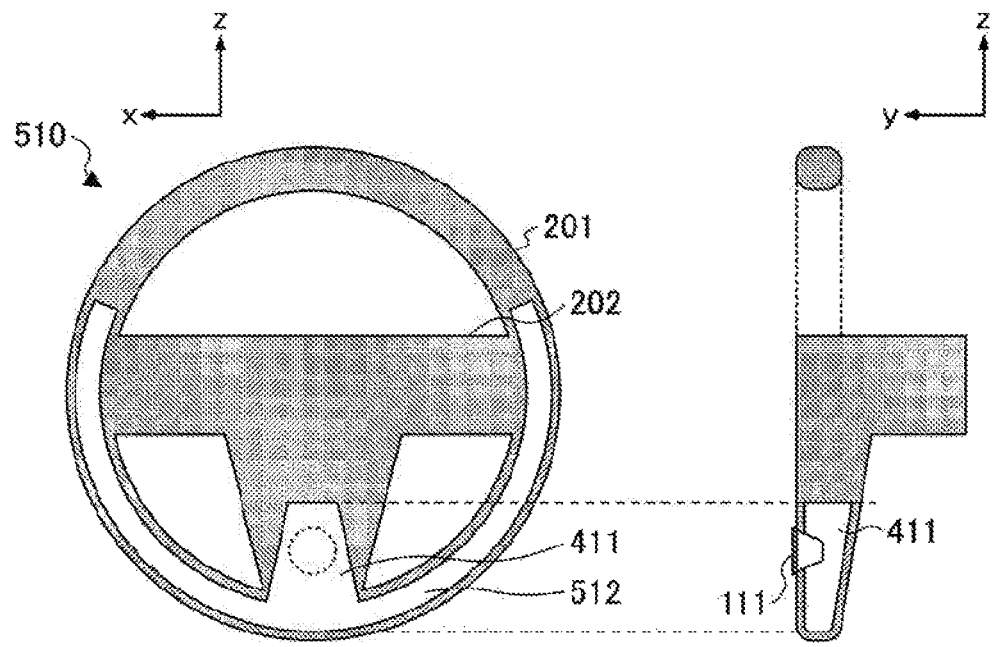
FIGS. 5A and 5B are drawings illustrating a second configuration example of the steering apparatus according to the first embodiment.
Figure 5B:
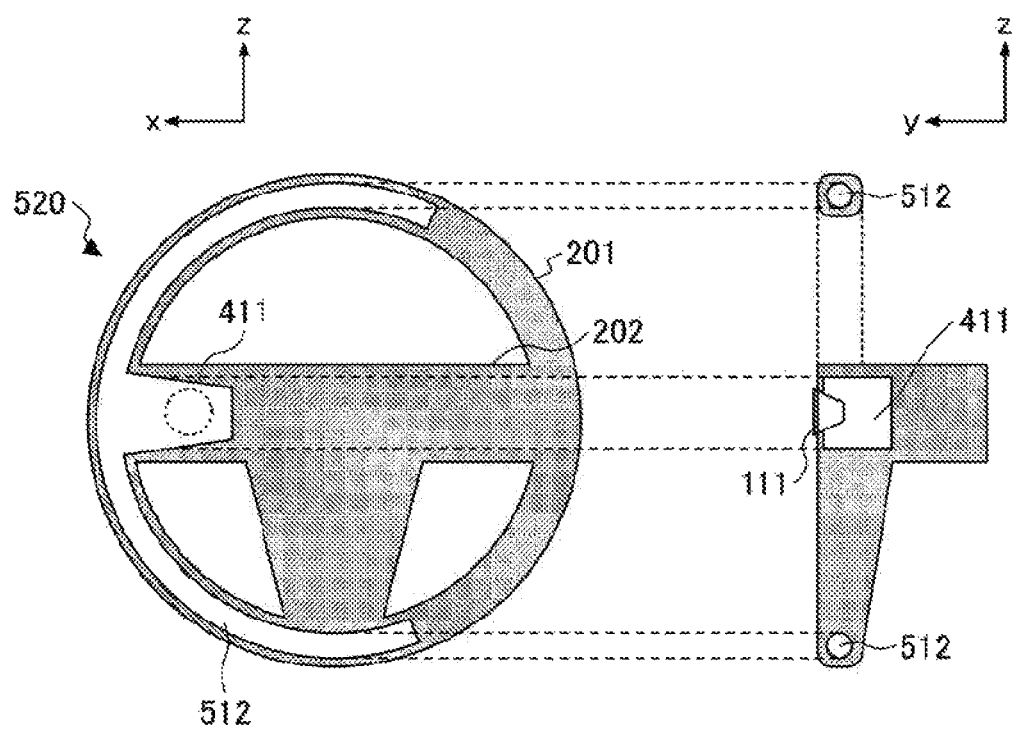

FIGS. 5A and 5B are drawings illustrating a second configuration example of the steering apparatus according to the first embodiment. Among them, FIG. 5A illustrates a steering apparatus 510 achieving a configuration approximately equivalent to a closed stereo apparatus, wherein a first rim chamber unit 512 is formed in a part of a ring shape of a rim member 201.

As illustrated in FIG. 5A, as long as the sound output apparatus 111 can secure a space sufficient for emitting a low frequency sound, the first rim chamber unit 512 does not have to be provided along the entire circumference of the ring shape in the rim member 201. In other words, the first rim chamber unit 512 is provided in a part of the ring shape in the rim member 201.

FIG. 5B illustrates a steering apparatus 520 achieving a configuration approximately equivalent to a closed stereo apparatus, wherein a first rim chamber unit 512 is formed in a part of a ring shape in the rim member 201. In the case of FIG. 5B, the sound output apparatus 111 is arranged on the left-hand side of the center member 202 in the x axis direction. Accordingly, the first center chamber unit 411 is provided on the left-hand side of the center member 202 in the x axis direction. The first rim chamber unit 512 is provided in the left-hand side portion as a part of the ring shape of the rim member 201.

(3) Third Configuration Example of Steering Apparatus

In the examples of FIGS. 4A to 4C and FIGS. 5A and 5B, the configuration examples of the steering apparatuses where the sound output system 120 includes a single sound output apparatus 111 have been explained. However, the sound output system 120 may have two sound output apparatuses.

Figure 6A:
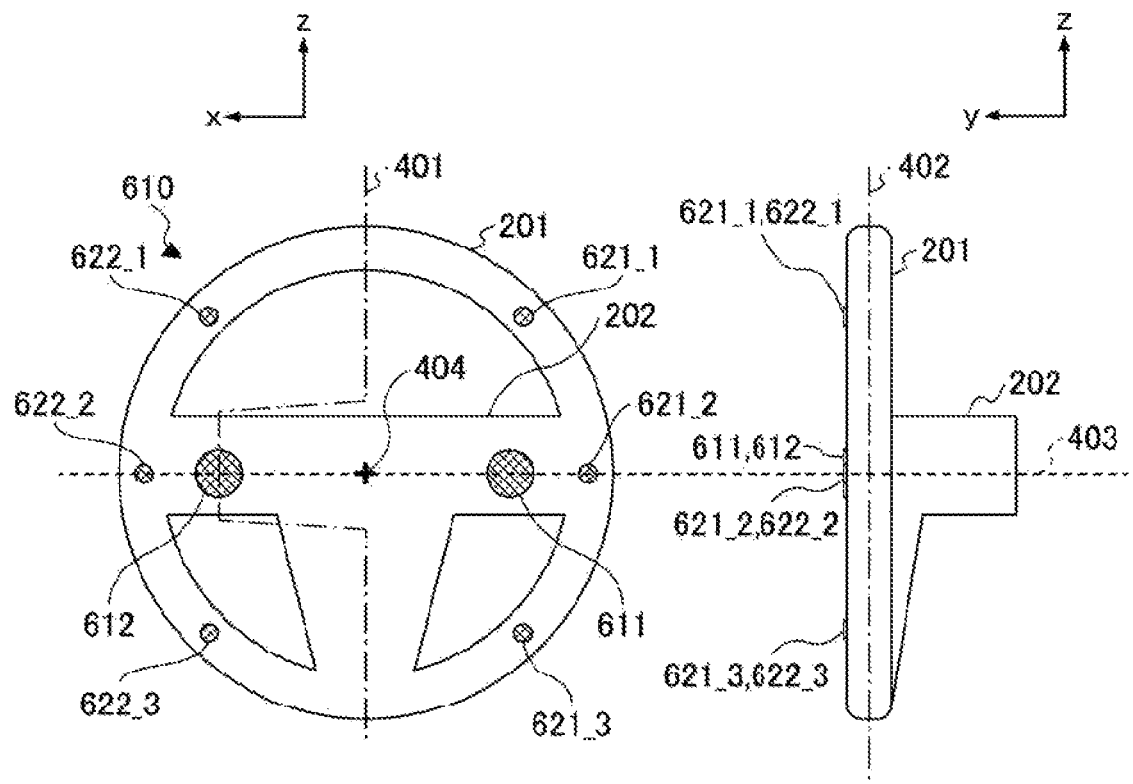
FIGS. 6A and 6B are drawings illustrating a third configuration example of the steering apparatus according to the first embodiment.
Figure 6B:
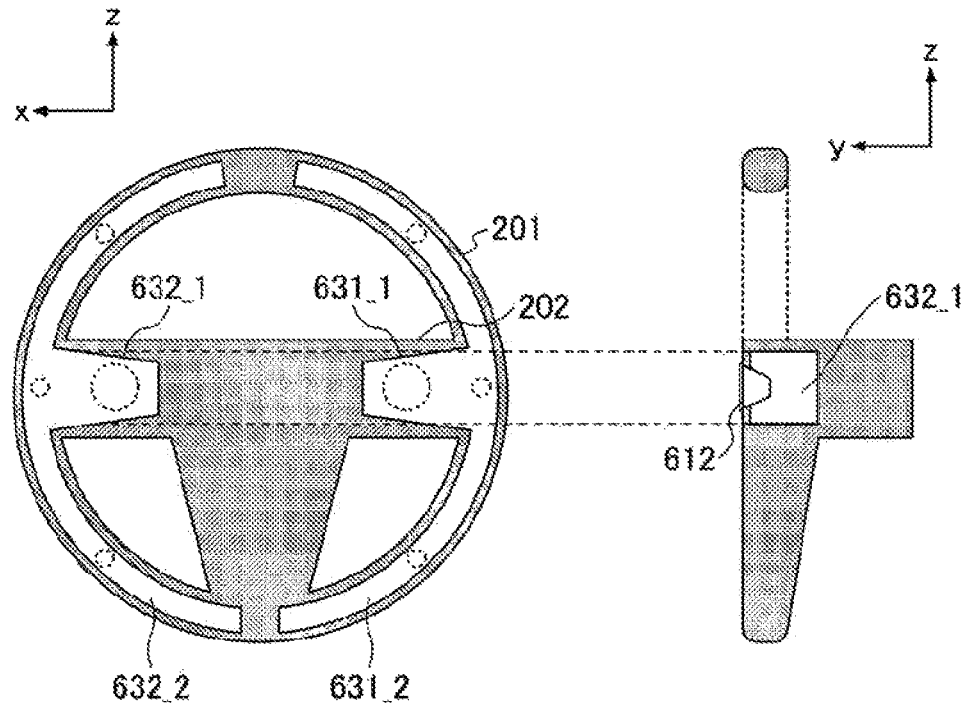

FIGS. 6A and 6B are drawings illustrating a third configuration example of the steering apparatus according to the first embodiment. Among them, FIG. 6A includes a front view and a right side view illustrating an external configuration of a steering apparatus 610 achieving a configuration approximately equivalent to a closed stereo apparatus and provided with two sound output apparatuses.

As illustrated in FIG. 6A, for example, two sound output apparatuses may be arranged line-symmetrically with respect to a straight line passing through a rotation center 404 (i.e., a straight line (not illustrated) in the z axis direction). Specifically, the two sound output apparatuses may be arranged, as sound output apparatuses 611, 612, at the right and left positions of the front surface of the center member 202 of the steering apparatus 610. Still alternatively, the two sound output apparatuses may be arranged, as sound output apparatuses 621_1, 622_1, on the front surface of the rim member 201 of the steering apparatus 610. Still alternatively, the two sound output apparatuses may be arranged, as sound output apparatuses 621_2, 622_2, on the front surface of the rim member 201 of the steering apparatus 610. Still alternatively, the two sound output apparatuses may be arranged, as sound output apparatuses 621_3, 622_3, on the front surface of the rim member 201 of the steering apparatus 610.

For example, the two sound output apparatuses may be arranged point-symmetrically with respect to the rotation center 404. Specifically, the two sound output apparatuses may be arranged, as sound output apparatuses 621_1, 622_3, on the front surface of the rim member 201 of the steering apparatus 610. Alternatively, the two sound output apparatuses may be arranged, as sound output apparatuses 621_3, 622_1, on the front surface of the rim member 201 of the steering apparatus 610.

FIG. 6B illustrates a front sectional view of the steering apparatus 610 taken along an alternate long and short dash line 402 of FIG. 6A, and a side sectional view of the steering apparatus 610 taken along an alternate long and short dash line 401 of FIG. 6A.

As illustrated in FIG. 6B, in the center member 202, the space (the first center chamber unit) 631_1 is provided on the negative side in the y axis direction with respect to the position where the sound output apparatus 611 is disposed. A space (second center chamber unit) 632_1 is provided on the negative side in the y axis direction with respect to the position where the sound output apparatus 612 is disposed.

A space (first rim chamber unit) 631_2 in communication with the first center chamber unit 631_1 is provided in a part of the inside of the rim member 201 along the ring shape of the rim member 201. Further, a space (second rim chamber unit) 632_2 in communication with the second center chamber unit 632_1 is provided in a part of the inside of the rim member 201 along the ring shape of the rim member 201. In this case, the total volume of the first center chamber unit 631_1 and the first rim chamber unit 631_2 is substantially the same as the total volume of the second center chamber unit 632_1 and the second rim chamber unit 632_2.

The first rim chamber unit 631_2 and the second rim chamber unit 632_2 are not in communication with each other, and the spaces independent from each other are formed.

Specifically, a separation wall is provided between the first rim chamber unit 631_2 and the second rim chamber unit 632_2.

Accordingly, on the negative side in the y axis direction with respect to the positions where the two sound output apparatuses are provided line-symmetrically or point-symmetrically, closed spaces sufficient for emitting a low frequency sound are secured.

<Summary>

As can be understood from the above explanation, the steering apparatus according to the first embodiment includes:

a rim member in a ring shape configured to be grabbed by a driver;

a center member connected to a steering shaft at a rotation center of the rim member; and a sound output apparatus or two sound output apparatuses configured to emit a sound signal and disposed on a front surface of the center member or a front surface of the rim member, wherein the steering apparatus includes a rim chamber unit or rim chamber units disposed inside of the rim member along the ring shape of the rim member, the rim chamber unit or the rim chamber units being in communication with a space behind the sound output apparatus or respective spaces behind two sound output apparatuses.

In this manner, the space is formed in the rim member. Therefore, with the steering apparatus according to the first embodiment, a closed space sufficient for emitting a low frequency sound can be secured behind the sound output apparatus. As a result, the frequency characteristics of the sound emitted from the sound output apparatus can be improved.

Second Embodiment

In the above first embodiment, a sound output system transmitting a sound output signal generated by a sound generating unit to one or two sound output apparatuses has been explained. In contrast, in a sound output system according to the second embodiment, a sound signal generated by a sound generating unit is processed by a signal processing unit and transmitted to two sound output apparatuses, so that the sound is localized at a predetermined or given position of the driver.

<System Configuration of Sound Output System>

Figure 7:
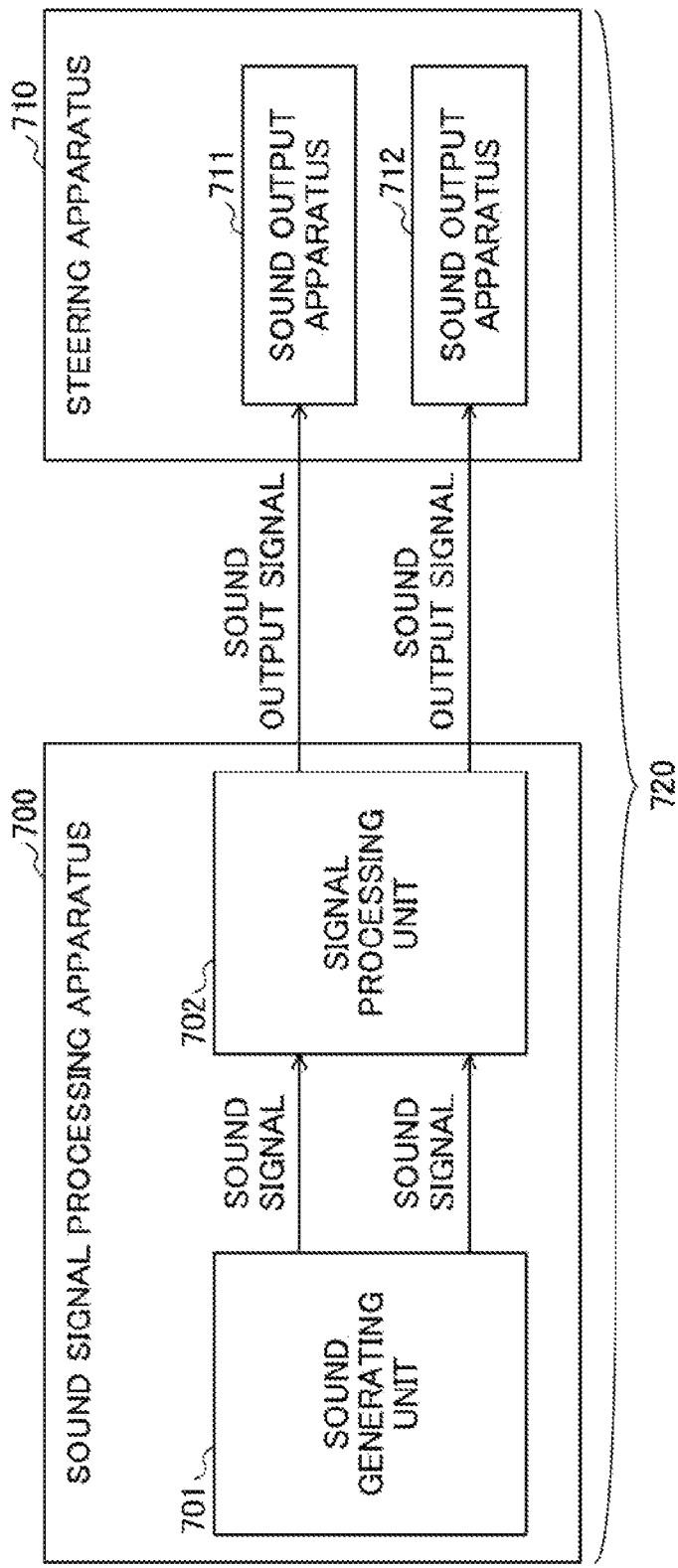
FIG. 7 is a drawing illustrating an example of a system configuration of a sound output system according to a second embodiment.

First, a system configuration of the sound output system in the vehicle according to the second embodiment is explained. FIG. 7 is a drawing illustrating an example of a system configuration of a sound output system according to the second embodiment.

As illustrated in FIG. 7, the sound output system 720 includes: a sound signal processing apparatus 700; and a steering apparatus 710 provided with sound output apparatuses (i.e., a first sound output apparatus and a second sound output apparatus) 711, 712. The sound signal processing apparatus 700 and the sound output apparatuses 711, 712 are connected to be able to transmit and receive signals.

On the sound signal processing apparatus 700, not only the sound generating program but also a signal processing program are installed. The sound signal processing apparatus 700 functions as a sound generating unit 701 and a signal processing unit 702 by executing the programs.

The sound generating unit 701 generates a sound signal and inputs the generated sound signal into the signal processing unit 702. The signal processing unit 702 generates a sound output signal by performing signal processing on the sound signals received from the sound generating unit 701, and transmits the sound output signal to the sound output apparatuses 711, 712. The sound output apparatuses 711, 712 output the sound output signal (i.e., a first sound output signal and a second sound output signal) transmitted from the signal processing unit 702.

<Functional Configuration of Sound Signal Processing Apparatus>

Figure 8:
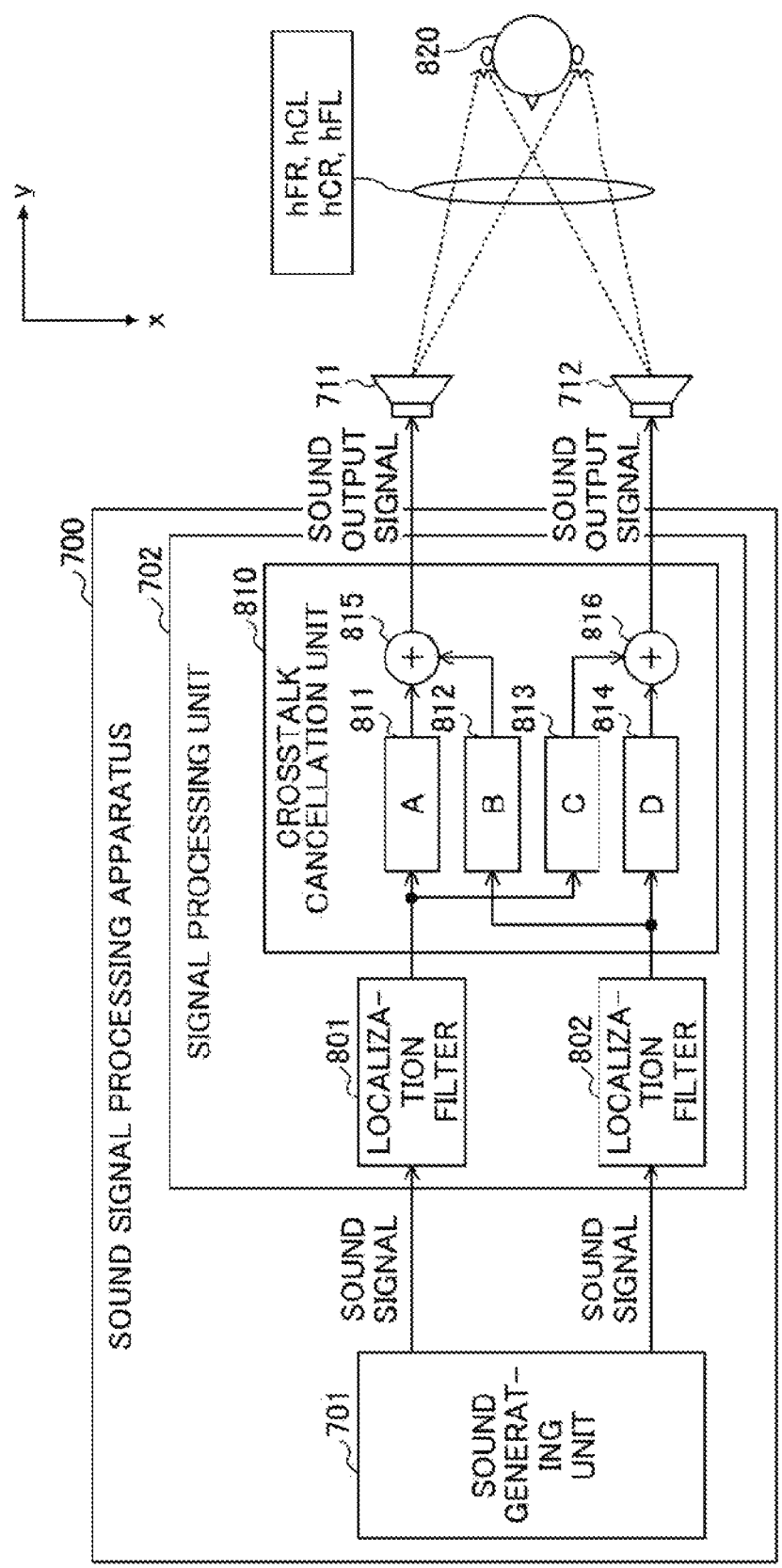
FIG. 8 is a drawing illustrating an example of a functional configuration of a sound signal processing apparatus of the sound output system according to the second embodiment.

Next, a functional configuration of the sound signal processing apparatus 700 is explained. FIG. 8 is a drawing illustrating an example of a functional configuration of the sound signal processing apparatus of the sound output system according to the second embodiment. As illustrated in FIG. 8, the signal processing unit 702 of the sound signal processing apparatus 700 includes localization filters 801, 802, and a crosstalk cancellation unit 810.

The localization filter 801 is a filter designed to allow the driver 820 to feel as if the sounds of the sound signals generated by the sound generating unit 701 come from the right-hand side of the driver 820. The sound signals processed by the localization filter 801 are input to the crosstalk cancellation unit 810.

The localization filter 802 is a filter designed to allow the driver 820 to feel as if the sounds of the sound signals generated by the sound generating unit 701 come from the left-hand side of the driver 820. The sound signals processed by the localization filter 802 are input to the crosstalk cancellation unit 810.

The crosstalk cancellation unit 810 multiplies the sound signals processed by the localization filters 801, 802 by parameters A to D. The parameters A to D are calculated on the basis of the following Expression (1).

[Math 1]

$$\begin{bmatrix} A & B \\ C & D \end{bmatrix} = \begin{bmatrix} hFR, & hCL \\ hCR, & hFL \end{bmatrix}^{-1} \quad \text{Expression (1)}$$

In the above Expression (1), "hFR" denotes a measured value representing transfer characteristics of sound from the sound output apparatus 711 to the right ear of the driver 820. "hFL" denotes a measured value representing transfer characteristics of sound from the sound output apparatus 712 to the left ear of the driver 820. "hCR" denotes a measured value representing transfer characteristics of sound from the sound output apparatus 711 to the left ear of the driver 820. "hCL" denotes a measured value representing transfer characteristics of sound from the sound output apparatus 712 to the right ear of the driver 820.

The multiplier 811 multiplies the sound signal processed by the localization filter 801 by the parameter A. The multiplier 812 multiplies the sound signal processed by the localization filter 802 by the parameter B.

The multiplier 813 multiplies the sound signal processed by the localization filter 801 by the parameter C. The multiplier 814 multiplies the sound signal processed by the localization filter 802 by the parameter D.

The adder 815 adds the sound signals multiplied by the parameters A, B by the multiplier 811 and the multiplier 812, respectively, and transmits the sum as a sound output signal to the sound output apparatus 711. The adder 816 adds the sound signals multiplied by the parameters C, D by the multiplier 813 and the multiplier 814, respectively, and transmits the sum as a sound output signal to the sound output apparatus 712.

Therefore, the sound signal processing apparatus 700 can localize the sound of the sound signal generated by the sound generating unit 701 to the right ear and/or the left ear of the driver 820.

<Configuration of Steering Apparatus>

Next, a configuration of the steering apparatus 710 is explained. In the steering apparatus 710 according to the second embodiment, when the sound output apparatuses 711, 712 are installed, two portions are hollowed out in the center member 202 in order to secure respective spaces sufficient for emitting low frequency sounds. Furthermore, two portions are hollowed out in the rim member 201. Accordingly, on the negative side in the y axis direction with respect to the sound output apparatuses 711, 712, not only the space in the center member 202 but also the closed space along the circular direction of the rim member 201 can be secured, when the sound output apparatuses 711, 712 are installed on the steering apparatus 710. In other words, with the steering apparatus 710 according to the second embodiment, a configuration approximately equivalent to a configuration of a closed stereo apparatus can be achieved.

Accordingly, the steering apparatus 710 according to the second embodiment can improve the frequency characteristics of the sound, and can output a low frequency sound. Hereinafter, the configuration examples (two configuration examples) of the steering apparatus according to the second embodiment are described.

(1) First Configuration Example of Steering Apparatus

Figure 9A:
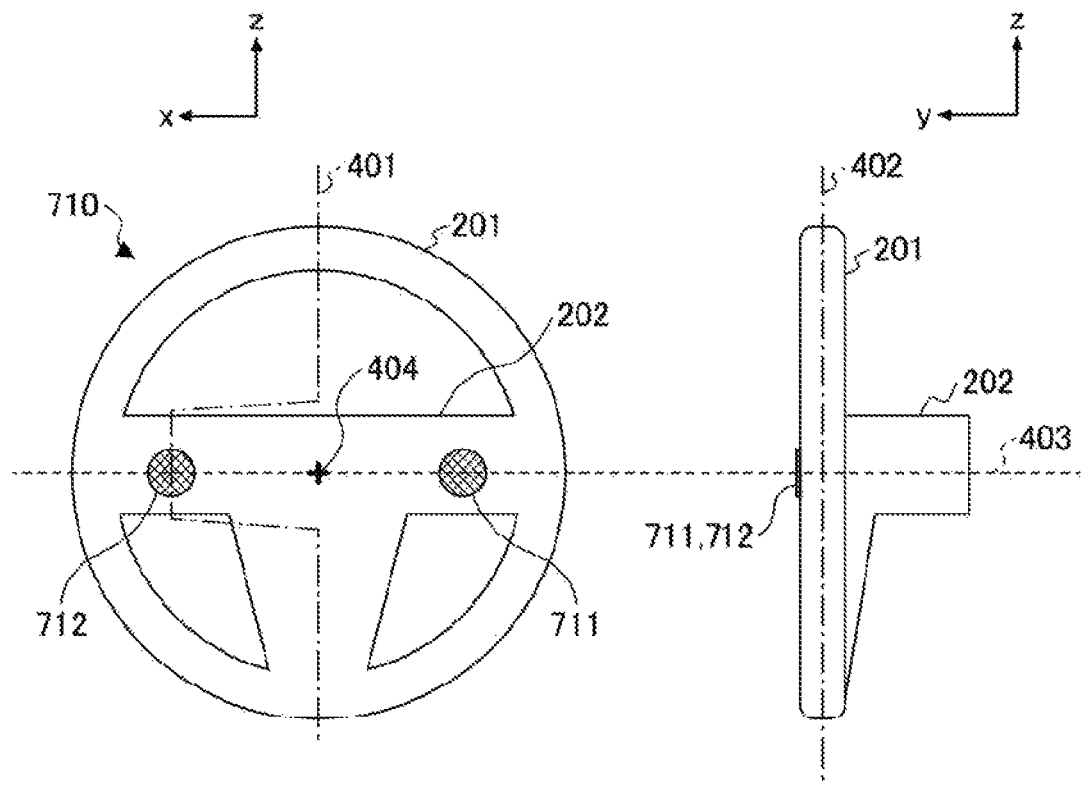
FIGS. 9A and 9B are drawings illustrating a first configuration example of the steering apparatus according to the second embodiment.
Figure 9B:
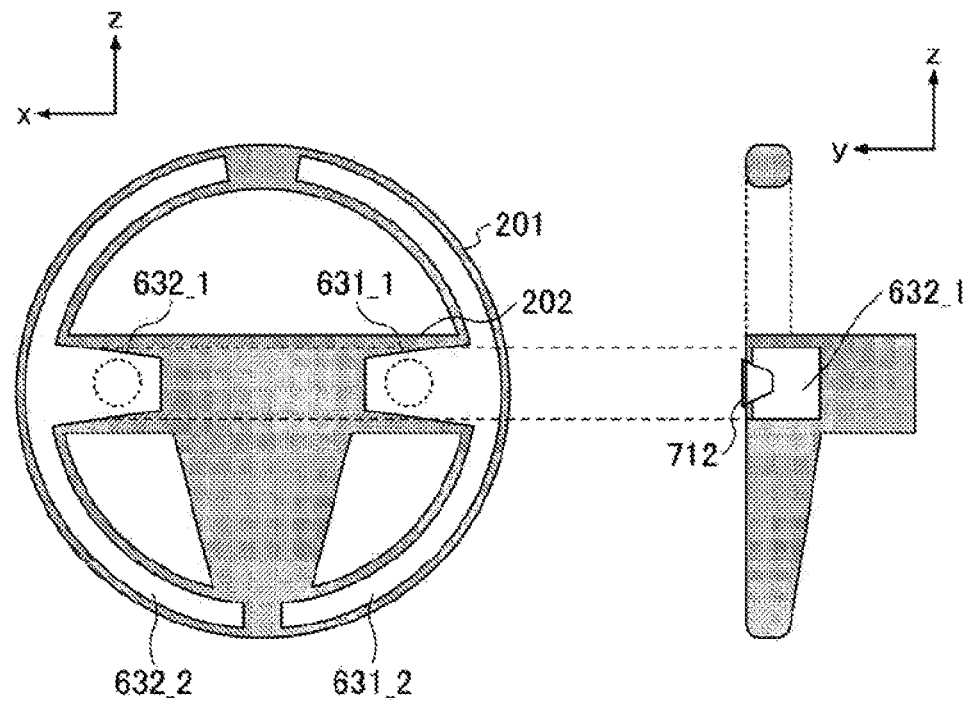

FIGS. 9A and 9B are drawings illustrating a first configuration example of the steering apparatus according to the second embodiment. Among them, FIG. 9A includes a front view and a right side view illustrating an external configuration of the steering apparatus 710 achieving a configuration approximately equivalent to a closed stereo apparatus.

As illustrated in FIG. 9A, the sound output apparatuses 711, 712 are installed, toward the driver (i.e., toward the positive side in the y axis direction), on the front surface of the center member 202 including the rotation center 404 of the rim member 201. At the right and left positions on the front surface of the center member 202, the sound output apparatuses 711, 712 are arranged line-symmetrically with respect to a straight line passing through the rotation center 404 (i.e., a straight line (not illustrated) in the z axis direction).

FIG. 9B illustrates a front sectional view of the steering apparatus 710 taken along an alternate long and short dash line 402 of FIG. 9A, and a side sectional view of the steering apparatus 710 taken along an alternate long and short dash line 401 of FIG. 9A.

As illustrated in FIG. 9B, in the center member 202, a space (first center chamber unit) 631_1 is provided on the negative side in the y axis direction with respect to the position where the sound output apparatus 711 is installed. A space (second center chamber unit) 632_1 is provided on the negative side in the y axis direction with respect to the position where the sound output apparatus 712 is installed.

Also, a space (first rim chamber unit) 631_2 in communication with the first center chamber unit 631_1 is provided in a part of the inside of the rim member 201 along the ring shape of the rim member 201. Further, a space (second rim chamber unit) 632_2 in communication with the second center chamber unit 632_1 is provided in a part of the inside of the rim member 201 along the ring shape of the rim member 201. In this case, the total volume of the first center chamber unit 631_1 and the first rim chamber unit 631_2 is substantially the same as the total volume of the second center chamber unit 632_1 and the second rim chamber unit 632_2.

The first rim chamber unit 631_2 and the second rim chamber unit 632_2 are not in communication with each other, and the spaces independent from each other are formed. Specifically, a separation wall is provided between the first rim chamber unit 631_2 and the second rim chamber unit 632_2.

Accordingly, on the negative side in the y axis direction with respect to the positions where the sound output apparatuses 711, 712 are arranged line-symmetrically, closed spaces sufficient for emitting low frequency sounds are secured.

(2) Second Configuration Example of Steering Apparatus

Figure 10A:
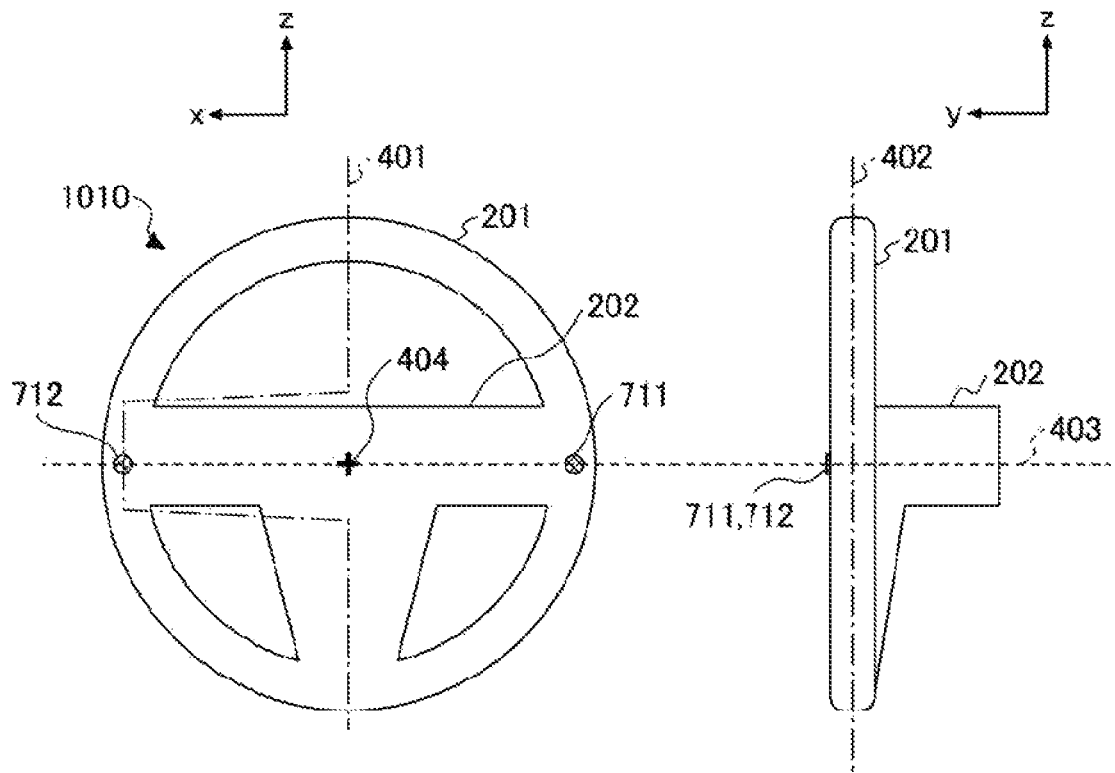
FIGS. 10A and 10B are drawings illustrating a second configuration example of the steering apparatus according to the second embodiment.
Figure 10B:
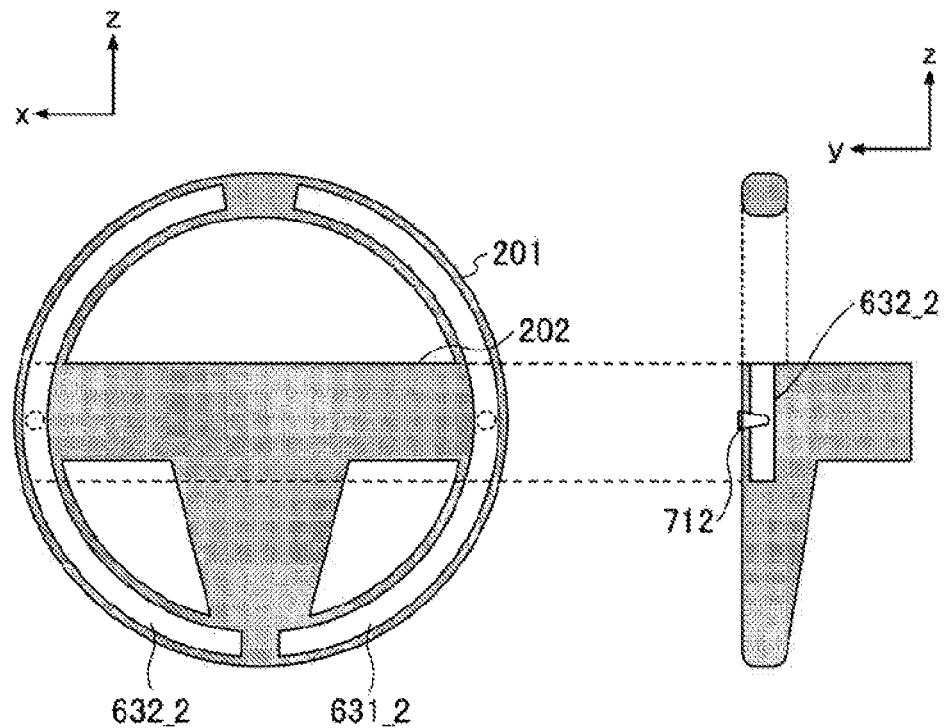

FIGS. 10A and 10B are drawings illustrating a second configuration example of the steering apparatus according to the second embodiment. The second configuration example of FIGS. 10A and 10B are different from FIGS. 9A and 9B in that in a steering apparatus 1010, sound output apparatuses 711, 712 are installed toward the driver (i.e., toward the positive side in the y axis direction) on the front surface of the rim member 201, not on the front surface of the center member 202. However, like FIGS. 9A and 9B, the sound output apparatuses 711, 712 are arranged line-symmetrically with respect to a straight line passing through the rotation center 404 (i.e., a straight line (not illustrated) in the z axis direction).

FIG. 10B illustrates a front sectional view of the steering apparatus 1010 taken along an alternate long and short dash line 402 of FIG. 10A, and a side sectional view of the steering apparatus 1010 taken along an alternate long and short dash line 401 of FIG. 10A.

FIG. 10B is different from FIG. 9B in that, because the sound output apparatuses 711, 712 are arranged on the front surface of the rim member 201, the first center chamber unit 631_1 and the second center chamber unit 632_1 are not provided in the center member 202.

In this manner, when spaces sufficient for emitting a low frequency sound can be secured with only the first rim chamber unit 631_2 and the second rim chamber unit 632_2 provided in the rim member 201, the sound output apparatuses 711, 712 may be disposed on the front surface of the rim member 201.

As explained with reference to FIGS. 6A and 6B, as long as the sound output apparatuses 711, 712 are arranged line-symmetrically, the sound output apparatuses 711, 712 may be arranged at other positions.

<Summary>

As can be understood from the above explanation, the sound output system according to the second embodiment includes:

a steering apparatus including a rim member in a ring shape grabbed by a driver and a center member connected to a steering shaft at a rotation center of the rim member, wherein two sound output apparatuses emitting sounds of sound signals are arranged line-symmetrically with respect to a center line passing through the rotation center (i.e., a straight line in the z axis direction) on a front surface of the center member or a front surface of the rim member, the steering apparatus includes a rim chamber unit provided in the rim member along the ring shape of the rim member and in communication with respective spaces behind the two sound output apparatuses, and the sound output system includes a signal processing unit to process a sound signal generated by a sound generating unit to localize sounds emitted from the sound output apparatuses to a desired portion of the driver.

In this manner, the spaces are formed in the rim member. Therefore, with the sound output system according to the second embodiment, closed spaces sufficient for emitting a low frequency sound can be secured behind the two respective sound output apparatuses. As a result, the frequency characteristics of the sounds emitted from the two sound output apparatuses can be improved. Furthermore, with the sound output system according to the second embodiment, the sounds emitted from the two sound output apparatuses can be localized to a predetermined or given portion of the driver.

Third Embodiment

In the above second embodiment, when sound signals processed to be localized to a predetermined or given portion of the driver are emitted from the two sound output apparatuses, a configuration approximately equivalent to a configuration of a closed stereo apparatus is achieved on the steering apparatus.

In contrast, in the third embodiment, ports or vents are additionally provided in association with the two respective sound output apparatuses, so that a configuration approximately equivalent to a configuration of a bass reflex stereo apparatus can be achieved in a steering apparatus, which amplifies low frequency sound by Helmholtz resonance. Hereinafter, the difference of the third embodiment from the above second embodiment is mainly explained.

<Configuration of Steering Apparatus>

Figure 11A:
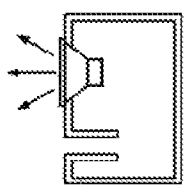
FIGS. 11A to 11C are drawings illustrating a configuration example of a steering apparatus according to a third embodiment.
Figure 11B:
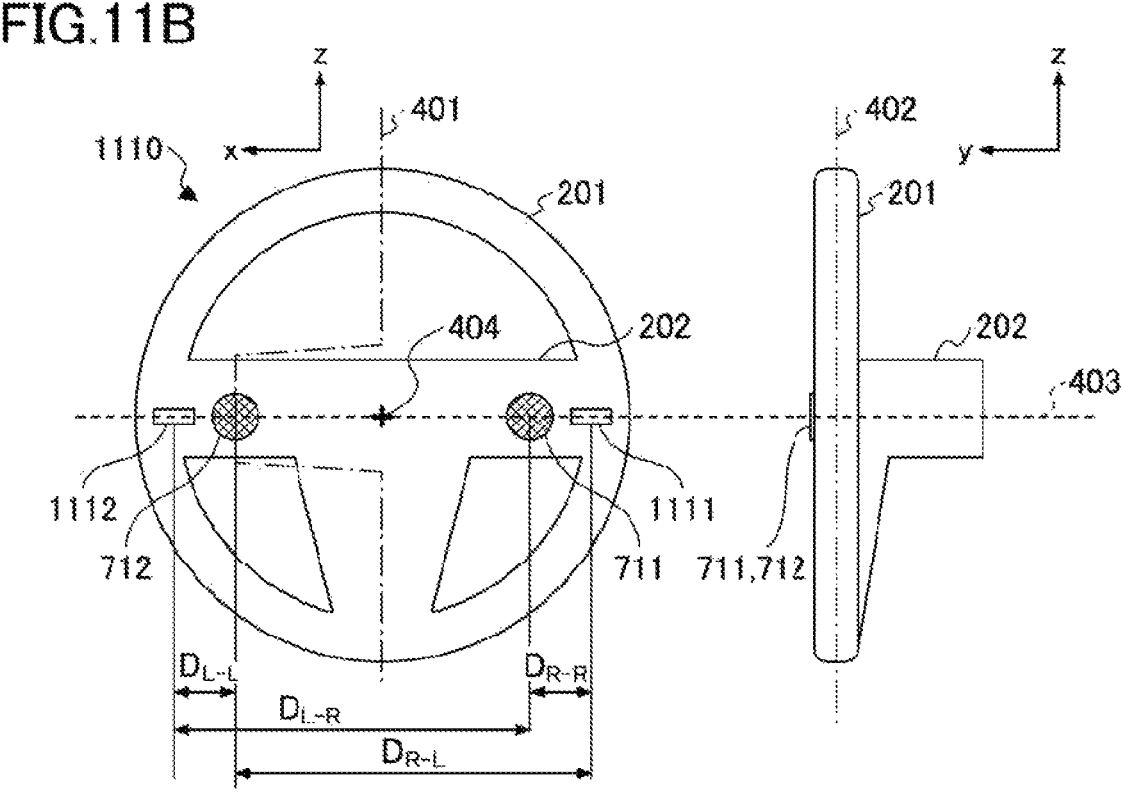
Figure 11C:
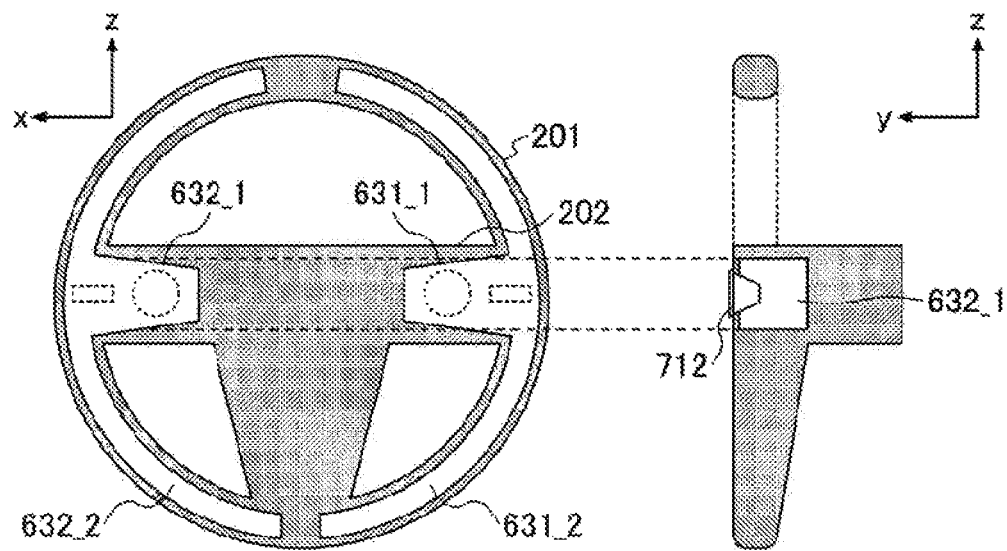

FIGS. 11A to 11C are drawings illustrating a configuration example of a steering apparatus according to the third embodiment. Among them, FIG. 11A is a schematic diagram illustrating a bass reflex stereo apparatus. FIG. 11B includes a front view and a right side view illustrating an external configuration of the steering apparatus 1110 achieving a configuration approximately equivalent to a bass reflex stereo apparatus.

The steering apparatus 1110 is different from FIG. 9B in that a port (first port) 1111 is formed, at a position of a distance $D_{R-R}$ from the sound output apparatus 711, in the front surface of the center member 202. Also, in the steering apparatus 1110, a port (second port) 1112 is formed, at a position of a distance $D_{L-L}$ from the sound output apparatus 712, in the front surface of the center member 202.

The ports 1111, 1112 have a tubular shape in the y axis direction. In other words, the ports 1111, 1112 are arranged in the same orientation as the sound output apparatus 711, 712, respectively. The length of the tube and the size of the cross sectional area of the tube of the port 1111 depend on the total volume of the first center chamber unit 631_1 and the first rim chamber unit 631_2. The length of the tube and the size of the cross sectional area of the tube of the port 1112 depend on the total volume of the second center chamber unit 632_1 and the second rim chamber unit 632_2.

In FIG. 11B, the ports 1111, 1112 are assumed to be arranged at positions satisfying the following expressions with respect to the sound output apparatuses 711, 712.

$$D_{L-L} < D_{L-R}$$

$$D_{R-R} < D_{R-L}$$

FIG. 11C illustrates a front sectional view of the steering apparatus 1010 taken along an alternate long and short dash line 402 of FIG. 11B, and a side sectional view of the steering apparatus 1010 taken along an alternate long and short dash line 401 of FIG. 11B. In FIG. 11C, the first center chamber unit 631_1, the second center chamber unit 632_1, the first rim chamber unit 6312, and the second rim chamber unit 632_2 have already been explained with reference to FIG. 9B, and therefore, explanation thereabout is omitted here.

<Summary>

As can be understood from the above explanation, the steering apparatus according to the third embodiment includes:

a rim member in a ring shape grabbed by a driver and a center member connected to a steering shaft at a rotation center of the rim member, wherein two sound output apparatuses emitting sounds of sound signals are arranged line-symmetrically with respect to the center line passing through the rotation center (i.e., a straight line in the z axis direction) on a front surface of the center member, ports are provided in proximity to the two sound output apparatuses on the front surface of the center member, a first center chamber unit and a second center chamber unit are provided in the center member and behind the sound output apparatuses and the ports, and the steering apparatus further includes a first rim chamber unit in communication with the first center chamber unit and a second rim chamber unit in communication with the second center chamber unit, the first rim chamber unit and the second rim chamber unit being provided in the rim member along the ring shape of the rim member.

In this manner, the space is formed in the rim member. Therefore, with the steering apparatus according to the third embodiment, the low frequency sound can be amplified by the Helmholtz resonance while spaces sufficient for the two sound output apparatuses to emit low frequency sounds are secured. As a result, the frequency characteristics of the sounds emitted from the two sound output apparatuses can be improved.

In the third embodiment, the ports 1111, 1112 are provided in proximity to the sound output apparatuses 711, 712, on the basis of the assumption that signal processing for localizing the sounds to a predetermined or given portion of the driver 820 is performed. However, in a case where the signal processing for localizing the sounds to a predetermined or given portion of the driver 820 is not performed, the ports 1111, 1112 do not have to be provided in proximity to the sound output apparatuses 711, 712. The ports 1111, 1112 may be provided on the back surface of the center member 202.

Fourth Embodiment

In the third embodiment, a configuration approximately equivalent to a bass reflex stereo apparatus is achieved on the steering apparatus. In contrast, in the fourth embodiment, a configuration approximately equivalent to a configuration of a back loaded horn stereo apparatus is achieved on a steering apparatus. Hereinafter, the difference of the fourth embodiment from the above third embodiment is mainly explained.

<Configuration of Steering Apparatus>

Figure 12A:
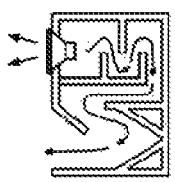
FIGS. 12A to 12C are drawings illustrating a configuration example of a steering apparatus according to a fourth embodiment.
Figure 12B:
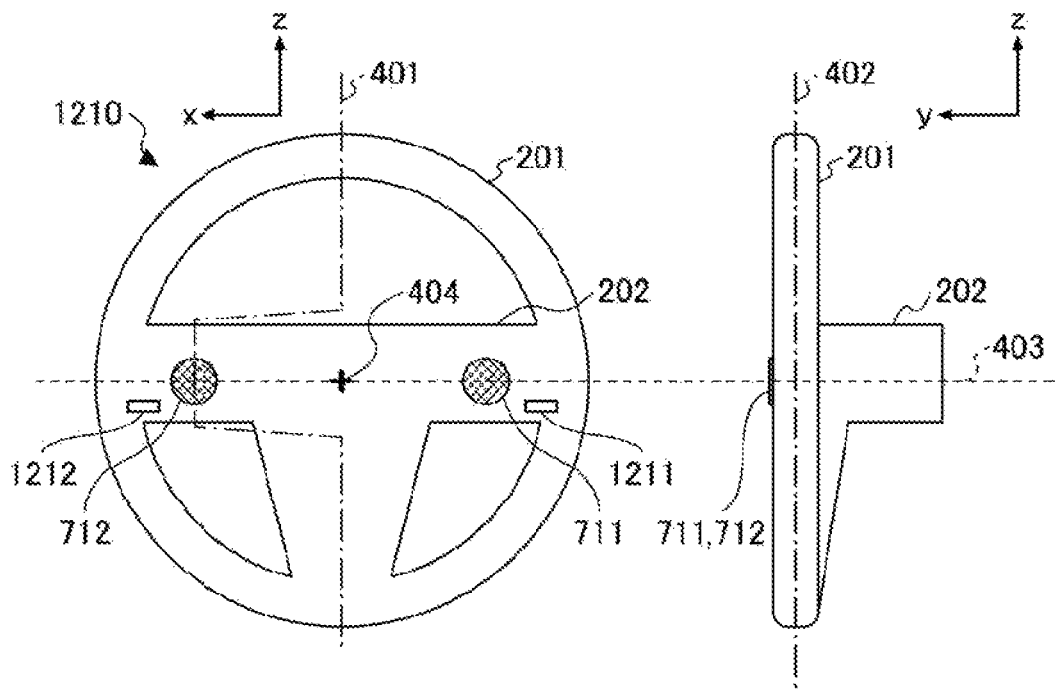
Figure 12C:
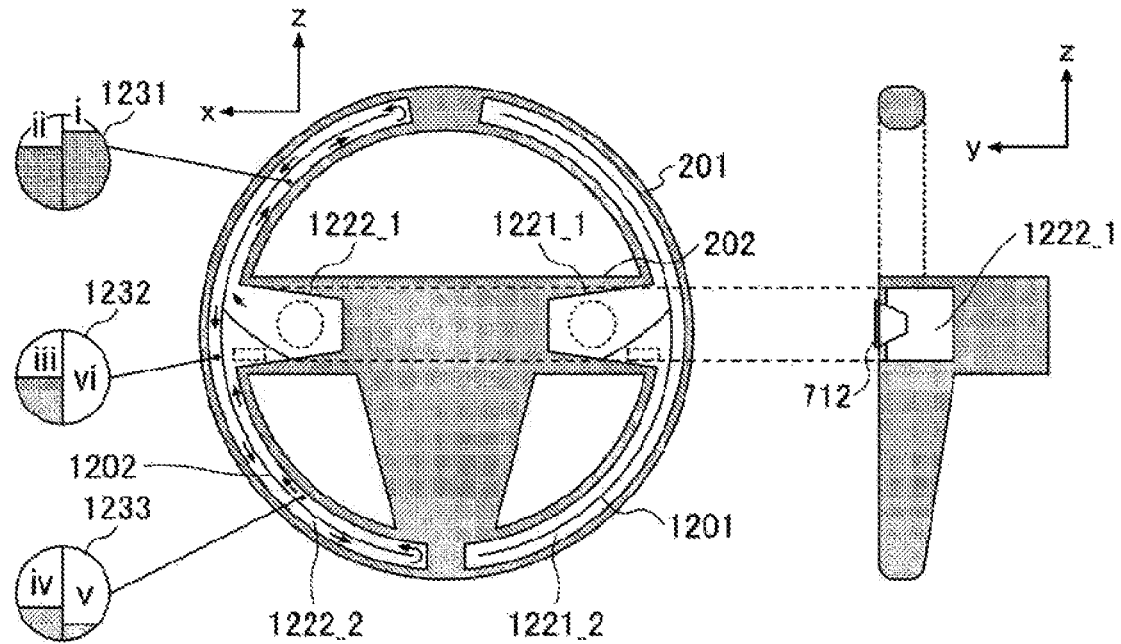

FIGS. 12A to 12C are drawings illustrating a configuration example of a steering apparatus according to the fourth embodiment. Among them, FIG. 12A is a schematic diagram illustrating a back loaded horn stereo apparatus. FIG. 12B includes a front view and a right side view illustrating an external configuration of a steering apparatus 1210 achieving a configuration approximately equivalent to a back loaded horn stereo apparatus.

The steering apparatus 1210 in FIG. 12B is different from the steering apparatus 1110 in FIG. 11B in that ports 1211, 1212 are provided on the front surface of the center member 202. The ports 1211, 1212 are different from the ports 1111, 1112 illustrated in FIG. 11B in the propagation path of the sound from the sound output apparatuses to the ports.

FIG. 12C illustrates a front sectional view of the steering apparatus 1210 taken along an alternate long and short dash line 402 of FIG. 12A, and a side sectional view of the steering apparatus 1210 taken along an alternate long and short dash line 401 of FIG. 12A.

As illustrated in FIG. 12C, a partitioning unit 1201 defining a propagation path of sound is provided in the first center chamber unit 1221_1 and the first rim chamber unit 1221_2. Likewise, a partitioning unit 1202 defining a propagation path of sound is provided in the second center chamber unit 1222_1 and the second rim chamber unit 1222_2.

Therefore, for example, the sound emitted from the rear of the sound output apparatus 712 propagates in the second center chamber unit 1222_1 and the second rim chamber unit 1222_2 along the arrows, and is output through the port 1212 to the outside. In FIG. 12C, the arrows indicate the propagation path of the sound emitted from the rear of the sound output apparatus 712. The arrows indicating the propagation path of the sound emitted from the rear of the sound output apparatus 711 are omitted. However, it is to be understood that the sound emitted from the rear of the sound output apparatus 711 propagates through a similar propagation path, and is output through the port 1211 to the outside.

In this case, as illustrated in FIG. 12C, in the second rim chamber unit 12222, the size of area of the cross section of the partitioning unit 1202 gradually increases according to the order of propagation of the sound.

Specifically, the border portion (i.e., throat portion) between the second center chamber unit 1222_1 and the second rim chamber unit 1222_2 has the smallest size of area of the cross section. In the second rim chamber unit 12222, the cross section gradually increases as illustrated in cross-sectional shapes 1231 to 1233.

For example, in the cross-sectional shape 1231, an area i is an area through which the sound emitted from the rear of the sound output apparatus 712 passes first. In the cross-sectional shape 1231, an area ii is an area through which the sound emitted from the rear of the sound output apparatus 712 passes after having passed through the area i.

In the cross-sectional shape 1232, an area iii is an area through which the sound emitted from the rear of the sound output apparatus 712 passes after having passed through the area ii. In the cross-sectional shape 1232, an area vi is an area through which the sound emitted from the rear of the sound output apparatus 712 finally passes.

In the cross-sectional shape 1233, an area iv is an area through which the sound emitted from the rear of the sound output apparatus 712 passes after having passed through the area iii. In the cross-sectional shape 1233, an area v is an area through which the sound emitted from the rear of the sound output apparatus 712 passes after having passed through the area iv.

As illustrated in the cross-sectional shapes 1231 to 1233, according to the order of propagation of sound, the size of area of the cross section increases in the following order: the area i, the area ii, the area iii, the area iv, the area v, and finally the area vi. In this manner, by configuring the cross-sectional shapes 1231 to 1233 according to the order of propagation of the sound, a configuration approximately equivalent to a configuration of a back loaded horn stereo apparatus can be achieved in the steering apparatus 1210.

<Summary>

As can be understood from the above explanation, a configuration approximately equivalent to a configuration of a back loaded horn stereo apparatus according to the fourth embodiment includes:

a rim member in a ring shape grabbed by a driver and a center member connected to a steering shaft at a rotation center of the rim member, wherein two sound output apparatuses emitting sounds of sound signals are arranged line-symmetrically with respect to a center line passing through the rotation center (i.e., a straight line in the z axis direction) on a front surface of the center member, ports are provided in proximity to the two respective sound output apparatuses in the front surface of the center member, a first center chamber unit and a second center chamber unit are provided in the center member and behind the sound output apparatuses and the ports, a first rim chamber unit in communication with the first center chamber unit and a second rim chamber unit in communication with the second center chamber unit, the first rim chamber unit and the second rim chamber unit being provided in the rim member along the ring shape of the rim member, partitioning units defining propagation paths of sounds from the sound output apparatuses to the ports are provided in the first center chamber unit, the second center chamber unit, the first rim chamber unit, and the second rim chamber unit, and sizes of areas of cross sections of the sound propagation paths of the sounds defined by the partitioning units are configured to gradually increase according to order of the propagation of the sounds.

In this manner, the space is formed in the rim member. Therefore, with the steering apparatus according to the fourth embodiment, a configuration approximately equivalent to a configuration of a back loaded horn stereo apparatus can be achieved while spaces sufficient for the two sound output apparatuses to emit low frequency sounds are secured. As a result, the frequency characteristics of the sounds emitted from the two sound output apparatuses can be improved.

In the fourth embodiment, the ports 1211, 1212 are provided in proximity to the sound output apparatuses 711, 712, on the basis of the assumption that signal processing for localizing the sounds to a predetermined or given portion of the driver 820 is performed. However, in a case where the signal processing for localizing the sounds to a predetermined or given portion of the driver 820 is not performed, the ports 1211, 1212 do not have to be provided in proximity to the sound output apparatuses 711, 712. The ports 1211, 1212 may be provided on the back surface of the center member 202.

Further, in the fourth embodiment, the propagation paths of the sounds are defined by the partitioning units, but for example, the propagation paths of the sound may be defined by inserting a tube of which size of area of the cross section gradually increases according to the order of propagation of the sound in the rim member 201.

Fifth Embodiment

In the fourth embodiment, a configuration approximately equivalent to a configuration of a back loaded horn stereo apparatus is achieved in the steering apparatus. In contrast, in the fifth embodiment, a configuration approximately equivalent to a drone cone speaker apparatus is achieved in a steering apparatus. Hereinafter, the difference of the fifth embodiment from the above fourth embodiment is mainly explained.

<Configuration of Steering Apparatus>

Figure 13A:
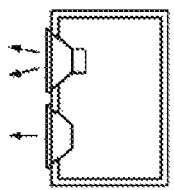
FIGS. 13A to 13C are drawings illustrating a configuration example of a steering apparatus according to a fifth embodiment.
Figure 13B:
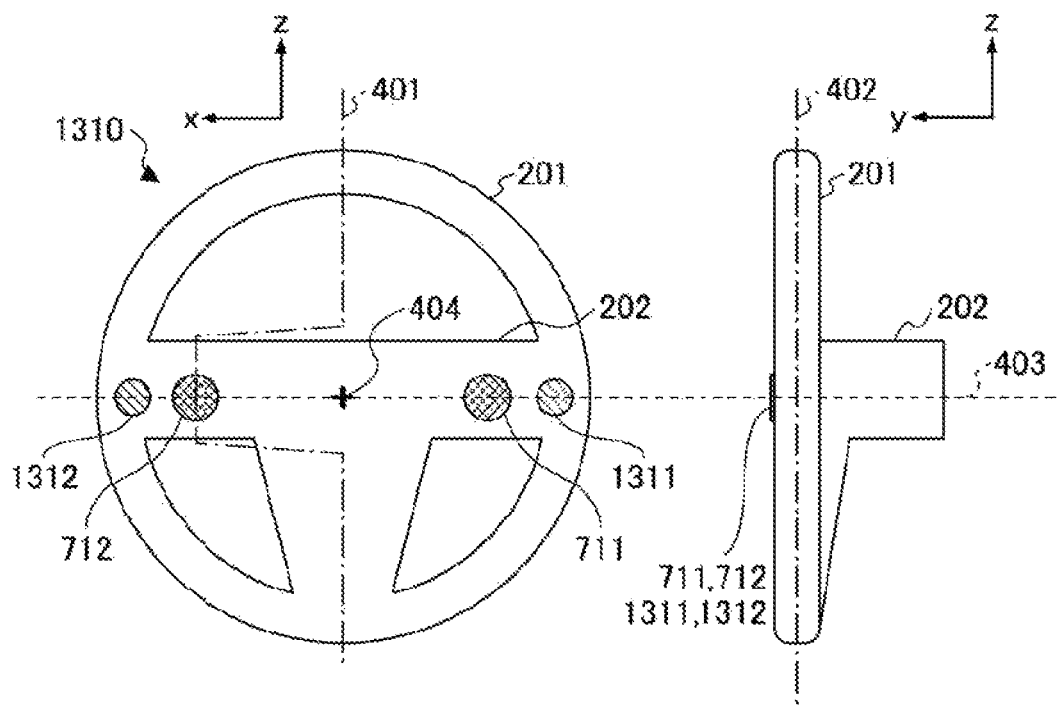
Figure 13C:
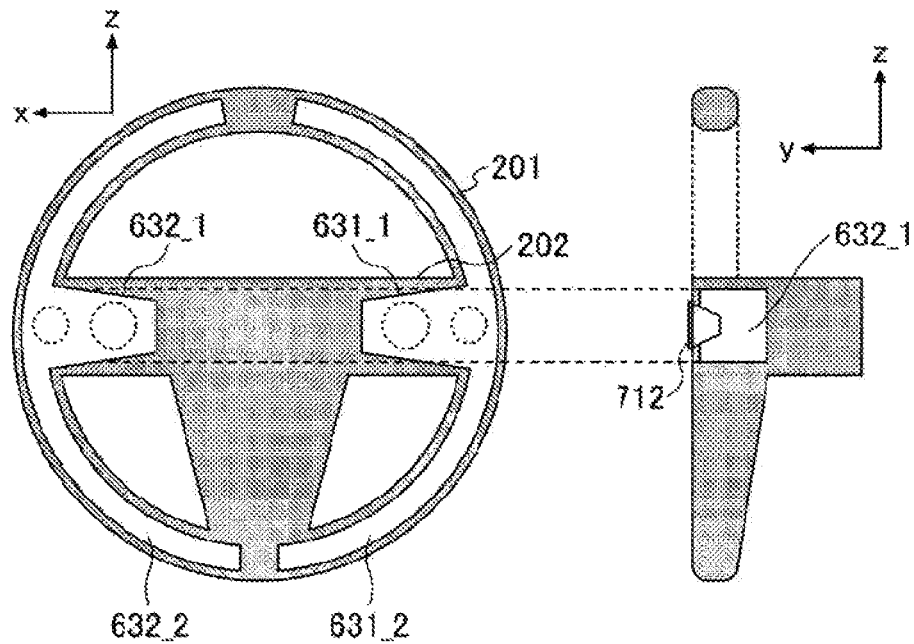

FIGS. 13A to 13C are drawings illustrating a configuration example of a steering apparatus according to the fifth embodiment. Among them, FIG. 13A is a schematic diagram illustrating a drone cone speaker apparatus. FIG. 13B includes a front view and a right side view illustrating an external configuration of a steering apparatus 1310 achieving a configuration approximately equivalent to a drone cone speaker apparatus.

The steering apparatus 1310 in FIG. 13B is different from the steering apparatus 1210 in FIG. 12B in that passive radiators (i.e., a first passive radiator, a second passive radiator) 1311, 1312 are provided on the front surface of the center member 202. The passive radiators 1311, 1312 are arranged in the same orientation as the sound output apparatus 711, 712, respectively. The passive radiators 1311, 1312 are similar to the sound output apparatuses 711, 712 but the passive radiators 1311, 1312 do not have any electromagnetic circuit. The passive radiators 1311, 1312 operate with vibration of air in the first center chamber unit 631_1 and the second center chamber unit 632_1.

The size and the mass of the passive radiator 1311 depend on the total volume of the first center chamber unit 631_1 and the first rim chamber unit 631_2. The size and the mass of the passive radiator 1312 depend on the total volume of the second center chamber unit 632_1 and the second rim chamber unit 632_2.

FIG. 13C illustrates a front sectional view of the steering apparatus 1310 taken along an alternate long and short dash line 402 of FIG. 13B, and a side sectional view of the steering apparatus 1310 taken along an alternate long and short dash line 401 of FIG. 13B. In FIG. 13C, the first center chamber unit 6311, the second center chamber unit 632_1, the first rim chamber unit 631_2, and the second rim chamber unit 632_2 have been explained in FIG. 9B, and therefore, explanation thereabout is omitted here.

<Summary>

As can be understood from the above explanation, the steering apparatus according to the fifth embodiment includes:

- a rim member in a ring shape grabbed by a driver and a center member connected to a steering shaft at a rotation center of the rim member,
- wherein two sound output apparatuses emitting sounds of sound signals are arranged line-symmetrically with respect to a center line passing through the rotation center (i.e., a straight line in the z axis direction) on a front surface of the center member,
- passive radiators are arranged in proximity to the two respective sound output apparatuses on the front surface of the center member,
- a first center chamber unit and a second center chamber unit are provided in the center member and behind the sound output apparatuses and the passive radiators, and
- the steering apparatus further includes a first rim chamber unit in communication with the first center chamber unit and a second rim chamber unit in communication with the second center chamber unit, the first rim chamber unit and the second rim chamber unit being provided in the rim member along the ring shape of the rim member.

In this manner, the space is formed in the rim member, and therefore, with the steering apparatus according to the fifth embodiment, a configuration approximately equivalent to a drone cone speaker apparatus is achieved while spaces sufficient for the two sound output apparatuses to emit low frequency sounds are secured. As a result, the frequency characteristics of the sounds emitted from the two sound output apparatuses can be improved.

In the fifth embodiment, the passive radiators 1311, 1312 are provided in proximity to the sound output apparatuses 711, 712, on the basis of the assumption that signal processing for localizing the sounds to a predetermined or given portion of the driver 820 is performed. However, in a case where the signal processing for localizing the sounds to a predetermined or given portion of the driver 820 is not performed, the passive radiators 1311, 1312 do not have to be provided in proximity to the sound output apparatuses 711, 712. Alternatively, the passive radiators 1311, 1312 may be provided on the back surface of the center member 202.

Sixth Embodiment

In the first to fifth embodiments, the rim member of the steering apparatus 110 has a single ring shape. However, the rim member of the steering apparatus does not have to have a single ring shape.

Figure 14:
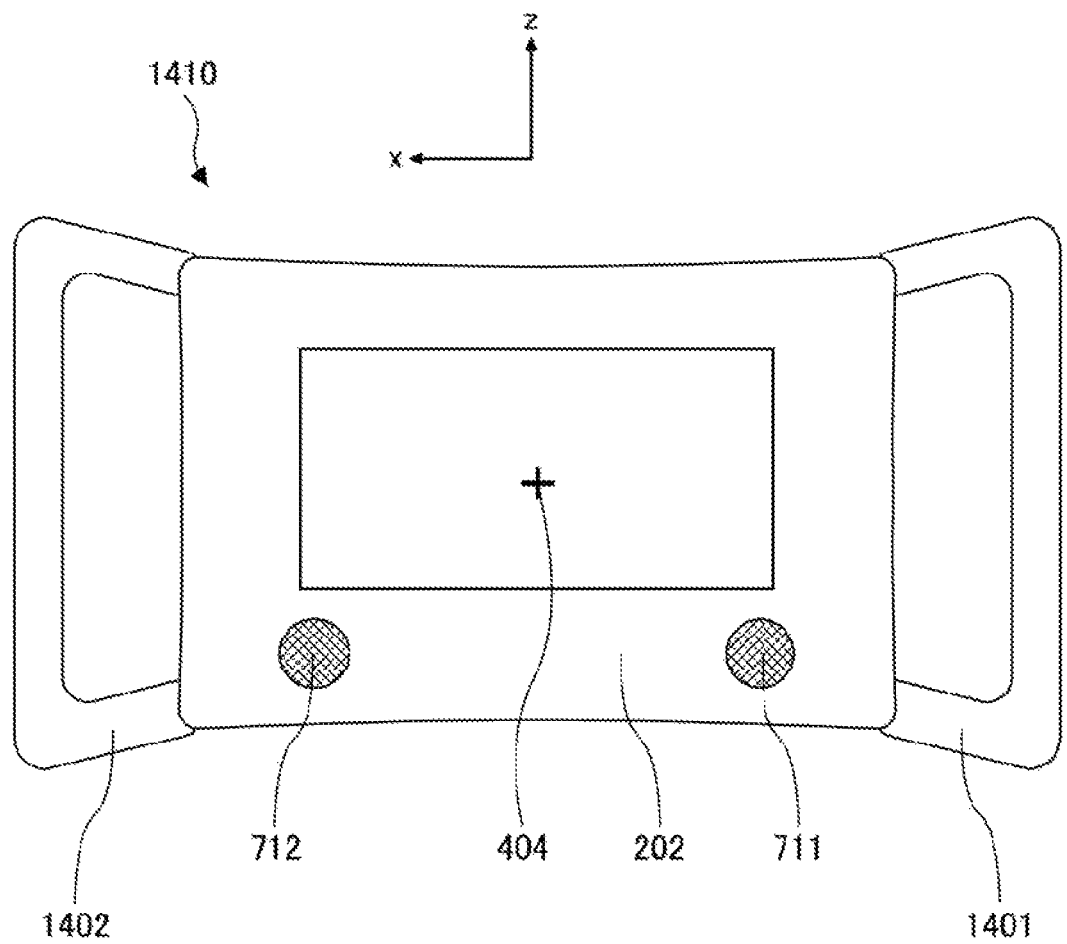
FIG. 14 is a figure illustrating an external shape of a steering apparatus according to a sixth embodiment.

FIG. 14 is a figure illustrating an external shape of a steering apparatus according to the sixth embodiment. The steering apparatus 1410 as illustrated in FIG. 14 is provided with rim members 1401, 1402 at the right and left-hand sides, which form two ring shapes. In addition, the steering apparatus 1410 includes a center member 202 connected to a steering shaft at a rotation center 404 of the rim members 1401, 1402.

Therefore, in a manner similar to the second to fifth embodiments, the steering apparatus 1410 can have sound output apparatuses 711, 712 oriented toward the driver (i.e., toward the positive side in the y axis direction) on the front surface of the center member 202 including the rotation center 404. The sound output apparatuses 711, 712 are arranged line-symmetrically with respect to a straight line passing through the rotation center 404 (i.e., a straight line in the z axis direction) on the front surface of the center member 202.

Therefore, in a manner similar to the second to fifth embodiments, the first center chamber unit, the second center chamber unit, the first rim chamber unit, and the second rim chamber unit can be provided, and effects similar to the second to fifth embodiments can be obtained.

It should be noted that the present disclosure is not limited to the configurations described above. Constituent elements other than the constituent elements described above can be combined with the constituent elements described in the above embodiments. The configurations can be changed without deviating from the gist of the present disclosure, and can be defined as appropriate according to the form of its application.

The frequency characteristics of the sound emitted from the sound output apparatuses installed in a steering apparatus can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A steering apparatus comprising:
   a rim member;
   a center member connected to a steering shaft at a rotation center of the rim member;
   a first sound output apparatus provided on a front surface of the center member;
   a second sound output apparatus provided on the front surface of the center member;

a first center chamber unit provided in the center member and arranged behind the first sound output apparatus; and a second center chamber unit provided in the center member and arranged behind the second sound output apparatus; wherein the first center chamber unit is independent of the second center chamber unit.

2. The steering apparatus according to claim 1, further comprising:

a first rim chamber unit provided in the rim member and in communication with the first center chamber unit; and a second rim chamber unit provided in the rim member and in communication with the second center chamber unit.

3. The steering apparatus according to claim 2, wherein the first sound output apparatus and the second sound output apparatus are arranged, on the front surface of the center member, at line-symmetry positions with respect a center line passing through the rotation center.

4. The steering apparatus according to claim 3, further comprising:

a first port arranged in proximity to the first sound output apparatus in a same orientation as the first sound output apparatus; and a second port arranged in proximity to the second sound output apparatus in a same orientation as the second sound output apparatus.

5. The steering apparatus according to claim 4, wherein the first port outputs a sound that is output from behind the first sound output apparatus and that propagates through a first propagation path including the first center chamber unit and the first rim chamber unit, wherein the second port outputs a sound that is output from behind the second sound output apparatus and that propagates through a second propagation path including the second center chamber unit and the second rim chamber unit, and wherein sizes of areas of cross sections of the first and second propagation paths are configured to increase according to an order of propagation of the sound.

6. The steering apparatus according to claim 3, further comprising:

a first passive radiator arranged in proximity to the first sound output apparatus in a same orientation as the first sound output apparatus; and a second passive radiator arranged in proximity to the second sound output apparatus in a same orientation as the second sound output apparatus.

7. A sound output system comprising:

the steering apparatus according to claim 4; and a sound signal processing apparatus configured to generate a first sound output signal and a second sound output signal transmitted to the first sound output apparatus and the second sound output apparatus.

8. The sound output system according to claim 7, wherein the sound signal processing apparatus generates the first sound output signal and the second sound output signal by performing processing to localize sound to a predetermined or given portion of the driver who operates the steering apparatus.

9. The steering apparatus according to claim 2, further comprising:

a separation wall being provided between the first rim chamber unit and the second rim chamber unit.

* * * * *